(12) United States Patent
Lan et al.

(10) Patent No.: US 10,405,323 B2
(45) Date of Patent: Sep. 3, 2019

(54) METHOD, USER EQUIPMENT AND BASE STATION FOR ADJUSTING MODULATION AND CODING SCHEME

(71) Applicant: NTT DoCoMo, Inc., Tokyo (JP)

(72) Inventors: Yang Lan, Beijing (CN); Anxin Li, Beijing (CN); Huiling Jiang, Beijing (CN)

(73) Assignee: NTT DoCoMo, Inc., Tokyo (JP)

( * ) Notice: Subject to any disclaimer, the term of this patent is extended or adjusted under 35 U.S.C. 154(b) by 39 days.

(21) Appl. No.: 15/000,275

(22) Filed: Jan. 19, 2016

(65) Prior Publication Data

US 2016/0262167 A1 Sep. 8, 2016

(30) Foreign Application Priority Data

Mar. 4, 2015 (CN) .......................... 2015 1 0096261

(51) Int. Cl.
*H04W 72/08* (2009.01)
*H04L 1/00* (2006.01)
(Continued)

(52) U.S. Cl.
CPC ......... *H04W 72/085* (2013.01); *H04L 1/0003* (2013.01); *H04L 1/0009* (2013.01);
(Continued)

(58) Field of Classification Search
CPC ....... H04L 1/20; H04L 5/0057; H04L 1/1607; H04L 1/0003; H04L 1/0009;
(Continued)

(56) References Cited

U.S. PATENT DOCUMENTS 8,861,662 B1 * 10/2014 Perets ................. H04L 1/0003
375/225
2005/0185733 A1 * 8/2005 Tolli ..................... H04L 1/0025
375/285
(Continued)

FOREIGN PATENT DOCUMENTS

| EP | 2385643 A1 * | 11/2011 | ........... H04L 1/0003 |
|---|---|---|---|
| EP | 2385643 A1 | 11/2011 | |
| WO | WO2011032274 A1 | 3/2011 | |

OTHER PUBLICATIONS

Extended European Search Report dated July 28, 2016.
European Office Action dated Apr. 10, 2018 from counterpart European App. No. 16150575.5.

*Primary Examiner* — Un C Cho
*Assistant Examiner* — Lalita W Pace
(74) *Attorney, Agent, or Firm* — Harness, Dickey & Pierce, P.L.C.

(57) ABSTRACT

The present disclosure provides a method, User Equipment (UE) and base station for adjusting a Modulation and Coding Scheme (MCS). The method comprises: receiving, by a user equipment (UE), a first downlink data frame sent by a base station at a first moment, and estimating, by the UE, a first Signal to Interference and Noise Ratio (SINR) and a first Channel Quality Indicator (CQI) according to the first downlink data frame; estimating a second SINR and a second CQI according to a received second downlink data frame, wherein the second downlink data frame is sent by the base station at a second moment later than the first moment; calculating, by the UE, a MCS variation according to at least one of the first CQI, the second CQI, the first SINR or the second SINR; and feeding back, by the UE, the MCS variation to the base station.

8 Claims, 10 Drawing Sheets

(51) Int. Cl.
*H04L 1/20* (2006.01)
*H04L 5/00* (2006.01)
*H04W 72/04* (2009.01)
*H04L 1/16* (2006.01)

(52) U.S. Cl.
CPC .......... *H04L 1/0016* (2013.01); *H04L 1/0025* (2013.01); *H04L 1/0035* (2013.01); *H04L 1/20* (2013.01); *H04L 5/0057* (2013.01); *H04W 72/0413* (2013.01); *H04L 1/0026* (2013.01); *H04L 1/1607* (2013.01)

(58) Field of Classification Search
CPC ... H04L 1/0016; H04L 1/0025; H04L 1/0035; H04L 1/0026; H04W 72/0413; H04W 72/085
USPC ......................................................... 370/329
See application file for complete search history.

(56) References Cited

U.S. PATENT DOCUMENTS

| | | | |
|---|---|---|---|
| 2010/0098012 A1* | 4/2010 | Bala | H04L 5/001 370/329 |
| 2013/0021931 A1* | 1/2013 | Kim | H04L 1/0003 370/252 |
| 2014/0003260 A1* | 1/2014 | Tabet | H04W 76/028 370/252 |
| 2014/0071838 A1* | 3/2014 | Jia | H04B 7/04 370/252 |
| 2015/0124709 A1* | 5/2015 | Ren | H04L 5/006 370/329 |
| 2015/0373732 A1* | 12/2015 | Davydov | H04L 5/00 370/329 |
| 2016/0249368 A1* | 8/2016 | Sadiq | H04W 72/085 |
| 2017/0141903 A1* | 5/2017 | Xu | H04L 5/0055 |

\* cited by examiner

METHOD, USER EQUIPMENT AND BASE STATION FOR ADJUSTING MODULATION AND CODING SCHEME

CROSS-REFERENCE TO RELATED APPLICATIONS

This application claims the benefit of priority from Chinese Patent Application, No. 201510096261.2, entitled "method, user equipment and base station for adjusting Modulation and Coding Scheme (MCS)" and filed on Mar. 4, 2015, the entire content of which is hereby incorporated by reference.

FIELD OF THE DISCLOSURE

The present disclosure relates to mobile communication technologies, and more particularly to a method, User Equipment (UE) and base station for adjusting a Modulation and Coding Scheme (MCS).

BACKGROUND

In a wireless communication system, in order to determine a MCS for downlink transmission by a base station, a UE is required to estimate a Signal to Interference and Noise Ratio (SINR) of a received signal, determine to feed back a Channel Quality Indicator (CQI), and feed back the CQI via an uplink resource to the base station. Then, the base station determines a MCS for downlink transmission according to the received CQI. This is called a CQI feedback procedure. The above-described way of determining a MCS is applied for the scenario of single-user transmission.

SUMMARY

The present disclosure provides a method for adjust a MCS, in order to improve the accuracy of downlink scheduling. Accordingly, system throughput and user throughput are enhanced in some degree.

In particular, examples of the present disclosure are given as follows.

A method for adjusting a Modulation and Coding Scheme (MCS), comprising:

receiving, by a user equipment (UE), a first downlink data frame sent by a base station at a first moment, and estimating a first Signal to Interference and Noise Ratio (SINR) and a first Channel Quality Indicator (CQI) according to the first downlink data frame;

estimating, by the UE, a second SINR and a second CQI according to a received second downlink data frame, wherein the second downlink data frame is sent by the base station at a second moment later than the first moment;

calculating, by the UE, a MCS variation according to at least one of the first CQI, the second CQI, the first SINR or the second SINR; and feeding back, by the UE, the MCS variation to the base station.

A user equipment, comprising:

a receiving module, configured to receive a first downlink data frame sent by a base station at a first moment and a second downlink data frame sent by the base station at a second moment, wherein the second moment is later than the first moment;

an estimating module, configured to estimate a first Signal to Interference and Noise Ratio (SINR) and a first Channel Quality Indicator (CQI) according to the first downlink data frame, and estimate a second SINR and a second CQI according to the second downlink data frame;

a calculating module, configured to calculate a Modulation and Coding Scheme (MCS) variation according to at least one of the first CQI, the second CQI, the first SINR or the second SINR; and a feedback module, configured to feed back the MCS variation to the base station.

A base station, comprising:

a receiving module, configured to receive a Modulation and Coding Scheme (MCS) variation feed back by a User Equipment (UE);

an adjusting module, configured to adjust a MCS used for transmitting the UE's downlink data according to the MCS variation; and a transmitting module, configured to perform modulation and coding to the UE's downlink data according to the MCS adjusted by the adjusting module, and transmit the downlink data after modulation and coding to the UE.

DETAILED DESCRIPTION

In order to make technical solutions and merits of the present disclosure clearer, the present disclosure will be described in detail in combination with examples and accompanying drawings.

For the scenario of multiple-user transmission, when determining the CQI, a UE is not able to consider interference caused by other UEs in a same cell or other cells in actual downlink data transmission, so that the MCS determined by the base station according to the feedback CQI is much different from the ideal MCS that UE may use in actual downlink data transmission. Hence, accuracy of downlink scheduling by the base station is reduced, and spectrum efficiency of some users may also be reduced.

Figure 1:
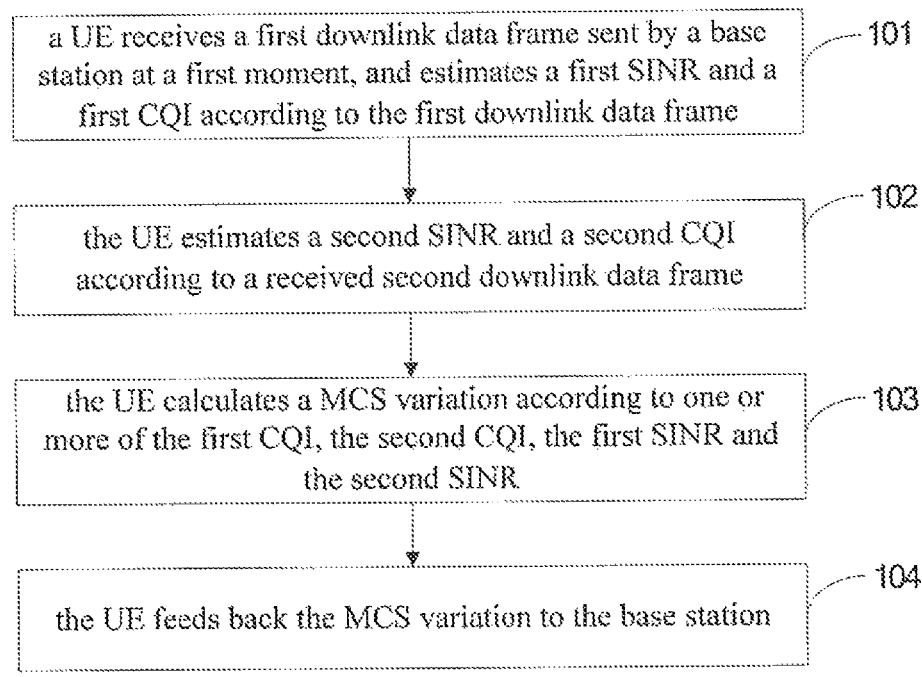
FIG. 1 is a flow chart illustrating a method for adjusting a MCS according to an example of the present disclosure.

FIG. 1 is a flow chart illustrating a method for adjusting a MCS according to an example of the present disclosure, including the following procedures. In block 101, a UE receives a first downlink data frame sent by a base station at a first moment, and estimates a first SINR and a first CQI according to the first downlink data frame. In block 102, the UE estimates a second SINR and a second CQI according to a received second downlink data frame, wherein the second downlink data frame is sent by the base station at a second moment later than the first moment. In block 103, the UE calculates a MCS variation according to at least one of the first CQI, the second CQI, the first SINR or the second SINR. In block 104, the UE feeds back the MCS variation to the base station.

In the above-described block 101 and 102, the UE may estimate a first SINR and a first CQI, the second SINR and the second CQI, respectively from the first downlink data frame sent at a first moment and the second downlink data frame sent at a second moment. It should be noted that, the UE may use a same method to estimate SINR and CQI at these two moments.

In an implementation, a SINR may refer to a ratio between strength of a received useful signal and strength of a received interference signal plus noise. In downlink transmission, the interference signal may come from other base stations. CQI is used to indicate the channel quality of downlink transmission in a Resource Block (RB) allocated to the UE, which may be represented by a CQI index corresponding to the MCS.

It should be noted that, a MCS mentioned in examples of the present disclosure refers to a combined modulation and coding scheme, i.e., a MCS include a modulation scheme and a coding scheme.

For example, Table 1 shows a correspondence table between a CQI index feedback by 4 bits and a MCS. Values of the CQI index are between 1 and 15, respectively corresponding to 15 MCSs. The CQI index or each MCS may indicate channel quality of downlink transmission. In specific, 0 indicates a lowest channel quality, and 15 indicates a best channel quality.

TABLE 1

Correspondence table between a CQI index and MCS

| CQI index | MCS Modulation | Coding (rate × 1024) |
|---|---|---|
| 1 | QPSK | 78 |
| 2 | QPSK | 120 |
| 3 | QPSK | 193 |
| 4 | QPSK | 308 |
| 5 | QPSK | 449 |
| 6 | QPSK | 602 |
| 7 | 16QAM | 378 |
| 8 | 16QAM | 490 |
| 9 | 16QAM | 616 |
| 10 | 64QAM | 466 |
| 11 | 64QAM | 567 |

TABLE 1-continued

Correspondence table between a CQI index and MCS

| CQI index | MCS Modulation | Coding (rate × 1024) |
|---|---|---|
| 12 | 64QAM | 666 |
| 13 | 64QAM | 772 |
| 14 | 64QAM | 873 |
| 15 | 64QAM | 948 |

In an example, the UE may calculate a SINR in each RB according to a downlink reference signal (RS). The RS may be a Cell-specific RS (CRS).

The SINR can be calculated as follows:

$$SINR_k = \frac{P_{RSRP}}{P_{Int} + P_N}, k = 1, \ldots, M \quad (1)$$

where $SINR_k$ denotes a SINR at the kth RB, M denotes the number of RBs, $P_{RSRP}$ denotes the received power of RS, $P_{int}$ denotes an interference power, i.e., a sum of signal power received from adjacent cells at the RB for transmitting RS, and $P_N$ denotes noise power.

Due to frequency selectivity of wireless channel, for a UE which is allocated multiple RBs, each RB corresponds to a different channel quality. In LTE specifications, at each Transmission Time Interval (TTI), RBs allocated to a same UE may use a same MCS. Hence, for a specific UE, channel qualities corresponding to all RBs allocated to the UE may be averaged to obtain an equivalent CQI. In LTE, the equivalent CQI after averaging may be further classified as a subband CQI and a wideband CQI. Each subband and each wideband include multiple RBs. The subband CQI and the wideband CQI refer to an equivalent CQI in the corresponding number of RBs. Reporting a wideband CQI means reporting a CQI by UE with respect to the entire system bandwidth, i.e., the UE feeds back one CQI for the entire system bandwidth.

In an example, the equivalent CQI in block 101 and block 102 may be calculated as following: calculating a SINR of each RB according to the above-described expression (1), calculating an equivalent SINR of all RBs allocated to this UE by using an equivalent averaging function, and then finding a MCS which may enable the performance to approach the Block Error Rate (BLER) most. In this way, the equivalent CQI is determined as the index of the found MCS, and at the same time the equivalent SINR is also determined.

In LTE, the equivalent averaging function may include Exponential Effective SIR Mapping (EESM) and Mutual Information Effective SIR Mapping (MI-ESM). For EESM, the equivalent SINR is calculated as:

$$SINR_{eff} = -\beta \ln\left(\frac{1}{M}\sum_{k=1}^{M} e^{-\frac{SINR_k}{\beta}}\right) \quad (2)$$

where $SINR_{eff}$ denotes the equivalent SINR, $\beta$ is an optimization parameter, which may be obtained by a link-system level simulation for each MCS. For example, Table 2 shows a correspondence Table between $\beta$ and MCS. For each MCS, an empirical value of $\beta$ can be obtained.

TABLE 2

Correspondence Table between β and MCS

| MCS | | |
|---|---|---|
| Modulation | Coding rate | Value of β |
| QPSK | 1/3 | 1.1 |
| QPSK | 1/2 | 1.4 |
| QPSK | 3/4 | 1.3 |
| 16QAM | 1/2 | 3.1 |
| 16QAM | 3/4 | 4.2 |
| 64QAM | 2/3 | 11.4 |
| 64QAM | 3/4 | 13.6 |

For each MCS in EESM, the equivalent SINR corresponding to each MCS can be derived using the corresponding β via the expression (2). Then, a MCS which meets the requirement of a target BLER can be found according to a SINR-BLER mapping table.

The SINR-BLER mapping table may be represented by SINR-BLER simulation curves obtained via LTE link-level simulation. In general, the target BLER is 0.1. If there are multiple MCSs which can meet the requirement of target BLER, a MCS corresponding to a maximal spectrum efficiency may be selected, and its index is determined as the CQI index.

It can be seen that, as described above, the equivalent SINR can be determined according to the downlink data, and it is regarded as the first SINR in block 101 and the second SINR in block 102. Then, MCS is selected by meeting requirement of target BLER, and its corresponding index is regarded as the first CQI in block 101 and the second CQI in block 102.

In an implementation, the MCS variation in block 103 may be calculated as:

$$\Delta MCS = f(CQI_1, CQI_2, SINR_1, SINR_2) \quad (3)$$

where ΔMCS denotes the MCS variation, $CQI_1$, $CQI_2$, $SINR_1$ and $SINR_2$ denote the first CQI, the second CQI, the first SINR and the second SINR, respectively.

The first SINR and the first CQI denote the channel quality parameters estimated for transmitting a second downlink data frame; the second SINR and the second CQI denote the channel quality parameters when actually transmitting a second downlink data frame. That is, with respect to the downlink data to be transmitted to UE, the first SINR and the first CQI may stand for the estimated values, while the second SINR and the second CQI may stand for the actual values.

Thus, in block 103, the difference between the estimated value and the actual value calculated according to at least one of the first CQI, the second CQI, the first SINR or the second SINR can be calculated as the MCS variation.

In block 104, whether the UE feeds back the MCS variation to the base station may be semi-statically configured by a high-layer signaling, for example, a Radio Resource Control (RRC) signaling, or dynamically configured by the base station.

In an implementation, the UE may feed back the MCS variation in the following two ways:

(1) Feeding back the MCS variation according to the way of feeding back the second CQI For example, CQI may feed back periodically in a Physical Uplink Control CHannel (PUCCH), or aperiodically in a Physical Uplink Shared CHannel (PUSCH). The period and frequency resources for feeding back the CQI may be configured by the base station. When feeding back the MCS variation, the base station may configure a period same as the period for feeding back the CQI, and use a same physical uplink channel (PUCCH or PUSCH).

(2) Feeding back the MCS variation according to the way of feeding back the downlink HARQ result The downlink HARQ result includes ACKnowledgement (ACK) and Negative ACKnowledgement (NACK). After UE receives downlink data, the UE demodulates the received downlink data. If it is demodulated successfully, the UE may feed back an ACK to the base station; otherwise, the UE may feed back a NACK to the base station.

HARQ ACK/NACK results of the downlink data packet may be feed back by using one bit or two bits in PUCCH. Similarly, when feeding back the MCS variation, at least one bit in PUCCH may be used.

In a scenario, when a UE is moving in a high speed, channel quality when transmitting a first downlink data and a second downlink data may vary greatly, for example, due to the Doppler effect caused by the high-speed moving, so the bias between the estimated values (the first SINR and the first CQI) and the actual values (the second SINR and the second CQI) may become large. Hence, the MCS variation feed back to the base station may be applied to compensate the MCS for the following downlink data transmission.

Figure 2:
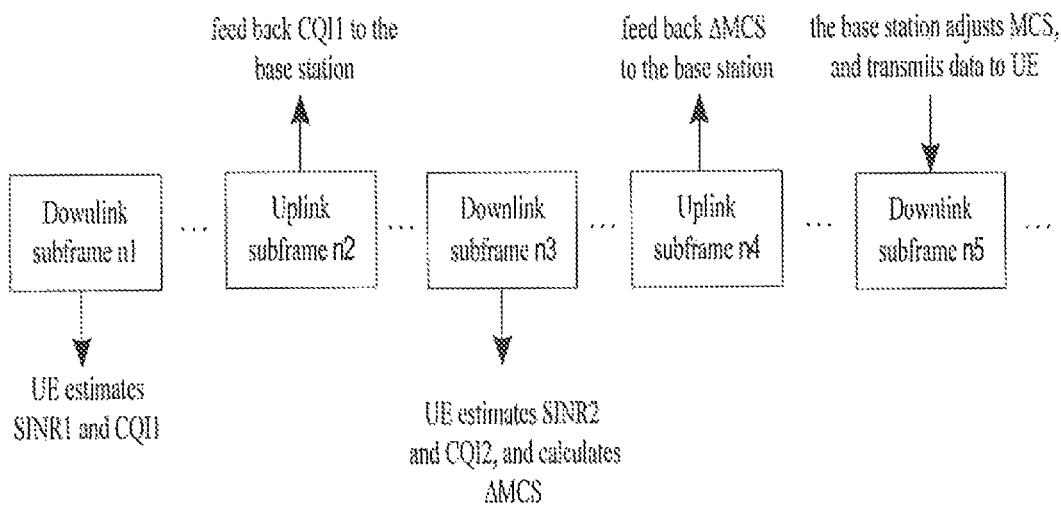
FIG. 2 is a schematic diagram illustrating timing for adjusting a MCS according to an example of the present disclosure.

FIG. 2 is a schematic diagram illustrating timing for adjusting a MCS according to an example of the present disclosure. As shown in FIG. 2, according to the timing, interactions between a UE and the base station include the following.

In a downlink subframe n1, the UE receives a first downlink data subframe, and estimates a first SINR ($SINR_1$) and a first CQI ($CQI_1$) according to block 101.

In an uplink subframe n2, the UE feeds back the first CQI ($CQI_1$) to the base station.

In a downlink subframe n3, the UE receives a second downlink data frame, and estimates a second SINR ($SINR_2$) and a second CQI ($CQI_2$) according to block 102, and calculates a MCS variation (ΔMCS) according to block 103.

In an uplink subframe n4, the UE feeds back the MCS variation (ΔMCS) to the base station.

In a downlink subframe n5, the base station adjusts the MCS according to the received MCS variation, and transmits to UE the downlink data after modulation and coding according to the adjusted MCS.

The n1, n2, n3, n4 and n5 denote the subframe number respectively, and they are in an ascending order. For example, in a TDD system, n2=n1+4, n4=n3+4. Values of these subframe numbers are not limited in detail in the present disclosure.

In the example, by estimating the first SINR and the first CQI according to the received first downlink data frame, estimating the second SINR and the second CQI according to the received second downlink data frame, calculating a MCS variation according to at least one of the first CQI, the second CQI, the first SINR or the second SINR, and feeding back the MCS variation to the base station, the base station can determine the channel quality bias estimated by UE, dynamically adjust the MCS used for actual downlink data transmission, improve the accuracy of MCS for following transmission, and hence enhance the system throughput and user throughput.

Figure 3:
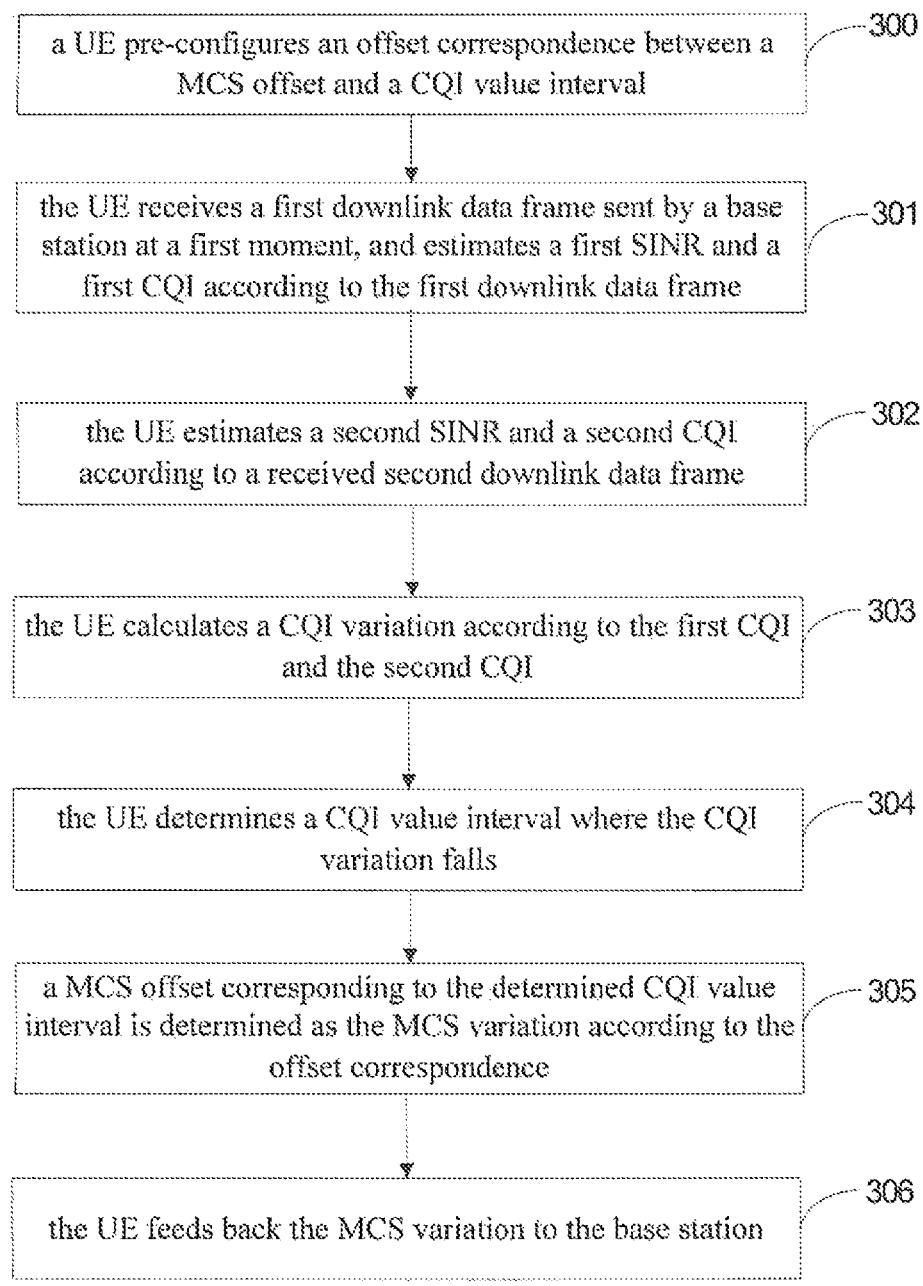
FIG. 3 is a flow chart illustrating a method for adjusting a MCS according to another example of the present disclosure.

FIG. 3 is a flow chart illustrating a method for adjusting a MCS according to another example of the present disclosure. In this method, the MCS variation is calculated according to the first CQI and the second CQI. As shown in FIG. 3, the method includes the following procedures.

In block 300, a UE pre-configures an offset correspondence between a MCS offset and a CQI value interval.

The MCS offset stands for possible values of the MCS variation. The CQI value interval stands for the range of a CQI variation (denoted by $\Delta$CQI). A MCS offset corresponds to a CQI value interval.

The offset correspondence between a MCS offset and a CQI value interval may be determined according to a moving speed of UE. For example, when the moving speed is high, possible values of MCS offsets in the offset correspondence may be more. When the moving speed is low, including static, nomadic, or moving with a low velocity, possible values of MCS offsets in the offset correspondence may be less.

In an example, the offset correspondence between a MCS offset and a CQI value interval is shown in Table 3. The MCS offset has two values, i.e., +1 and −1, so that the MCS variation may also have two values. In this case, 1 bit is required to feed back the MCS variation.

TABLE 3

Offset correspondence between a MCS offset and a CQI value interval

| MCS offset | CQI value interval |
|---|---|
| +1 | $\Delta$CQI >= 0 |
| −1 | $\Delta$CQI < 0 |

In another example, the offset correspondence between a MCS offset and a CQI value interval is shown in Table 4. The MCS offset has four values, i.e., +2, +1, −1 and −2, so that the MCS variation may also have four values. In this case, 2 bits are required to feed back the MCS variation.

TABLE 4

Offset correspondence between a MCS offset and a CQI value interval

| MCS offset | CQI value interval |
|---|---|
| +2 | $\Delta$CQI >= 3 |
| +1 | 0 < $\Delta$CQI < 3 |
| −1 | −3 < $\Delta$CQI < 0 |
| −2 | $\Delta$CQI <= −3 |

In yet another example, the offset correspondence between a MCS offset and a CQI value interval is shown in Table 5. The MCS offset has eight values. In this case, 3 bits are required to feed back the MCS variation.

TABLE 5

Offset correspondence between a MCS offset and a CQI value interval

| MCS offset | CQI value interval |
|---|---|
| +4 | $\Delta$CQI >= 6 |
| +3 | 4 < $\Delta$CQI <= 6 |
| +2 | 2 < $\Delta$CQI <= 4 |
| +1 | 0 < $\Delta$CQI <= 2 |
| −1 | −2 < $\Delta$CQI < 0 |
| −2 | −4 < $\Delta$CQI <= −2 |
| −3 | −6 < $\Delta$CQI <= −4 |
| −4 | $\Delta$CQI <= −6 |

In block 301, the UE receives a first downlink data frame sent by a base station at a first moment, and estimates a first SINR and a first CQI according to the first downlink data frame.

Description of this block is same as block 101, which is not described in detail herein.

In block 302, the UE estimates a second SINR and a second CQI according to a received second downlink data frame, wherein the second downlink data frame is sent by the base station at a second moment later than the first moment.

Description of this block is same as block 102, which is not described in detail herein.

In block 303, the UE calculates a CQI variation according to the first CQI and the second CQI.

The first CQI and the second CQI stand for a CQI index, respectively, so that CQI variation $\Delta$CQI is the difference between these two CQI indexes.

In block 304, the UE determines a CQI value interval where the CQI variation falls.

According to multiple CQI value intervals in the offset correspondence between a MCS offset and a CQI value interval configured in block 300, the UE determines which CQI value interval where the CQI variation calculated in block 303 falls.

In block 305, a MCS offset corresponding to the determined CQI value interval is determined as the MCS variation according to the offset correspondence.

In block 306, the UE feeds back the MCS variation to the base station.

For example, if the CQI variation $\Delta$CQI=2, when using the offset correspondence shown in Table 3, the corresponding CQI value interval is $\Delta$CQI>0, then the MCS offset is +1, so the MCS variation is +1, then UE transmits this MCS variation to the base station.

When the base station receives the MCS variation, it is determined that the previous MCS is required to increase. For example, as shown in Table 1, next MCS with a higher spectrum efficiency may be selected.

Figure 4:
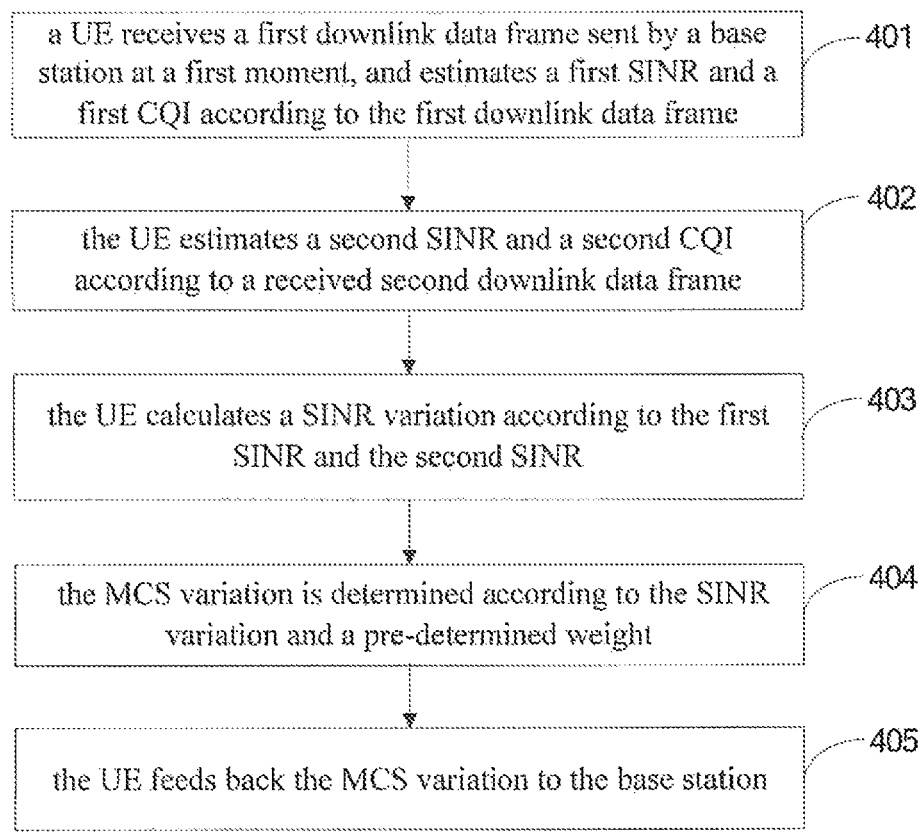
FIG. 4 is a flow chart illustrating a method for adjusting a MCS according to yet another example of the present disclosure.

FIG. 4 is a flow chart illustrating a method for adjusting a MCS according to yet another example of the present disclosure. In this method, the MCS variation is calculated according to the first SINR and the second SINR. As shown in FIG. 4, the method includes the following procedures.

In block 401, the UE receives a first downlink data frame sent by a base station at a first moment, and estimates a first SINR and a first CQI according to the first downlink data frame.

Description of this block is same as block 101, which is not described in detail herein.

In block 402, the UE estimates a second SINR and a second CQI according to a received second downlink data frame, wherein the second downlink data frame is sent by the base station at a second moment later than the first moment.

Description of this block is same as block 102, which is not described in detail herein.

In block 403, the UE calculates a SINR variation according to the first SINR and the second SINR.

In block 404, the MCS variation is determined according to the SINR variation and a pre-determined weight.

If the SINR variation is denoted by $\Delta$SINR, the pre-determined weight is denoted by $\lambda$, the MCS variation $\Delta$MCS is calculated by:

$$\Delta MCS = \lambda \times \Delta SINR \qquad (4)$$

where the range of the pre-determined weight is 0<$\lambda$<1.

For example, when $\Delta$SINR=3 dB in block 403, and $\lambda$=⅓, $\Delta$MCS=1.

In block 405, the UE feeds back the MCS variation to the base station.

Figure 5:
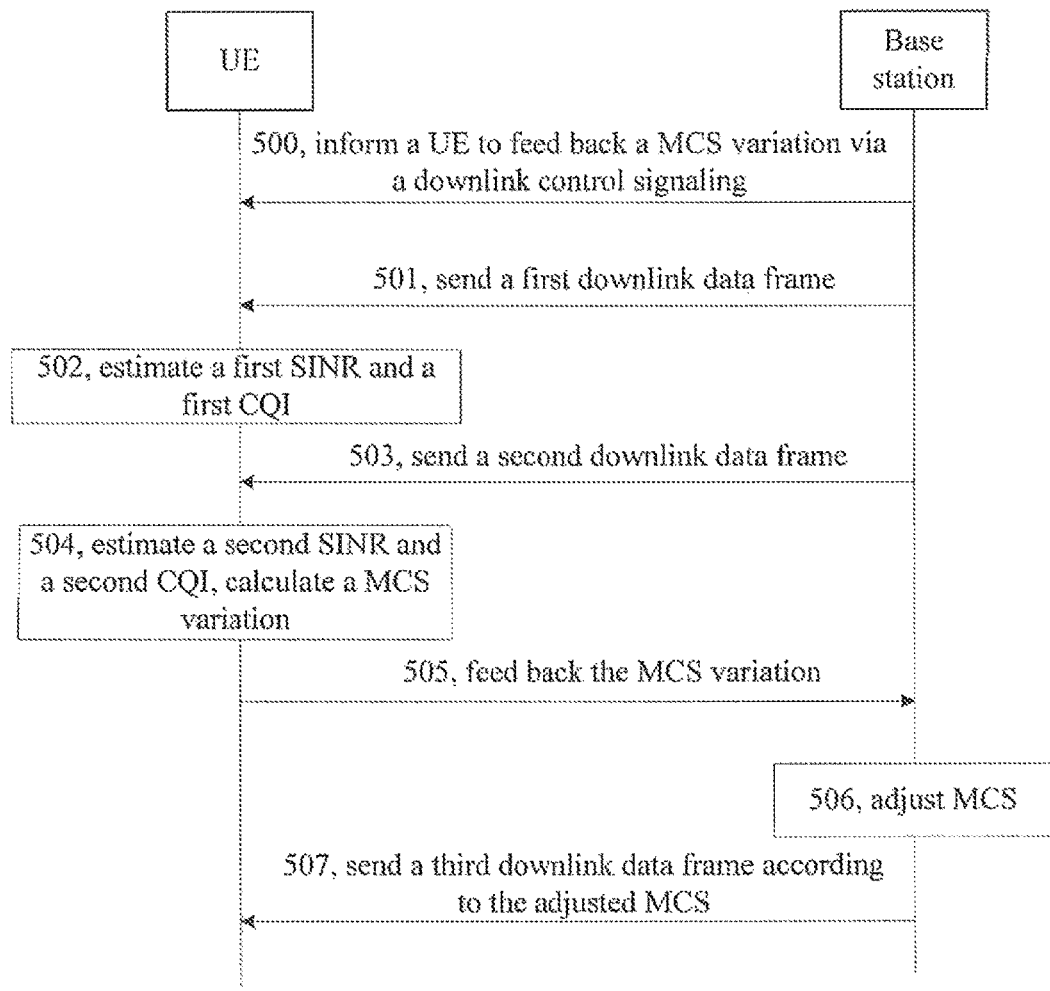
FIG. 5 is a schematic diagram illustrating signaling for adjusting a MCS according to an example of the present disclosure.

FIG. 5 is a schematic diagram illustrating signaling for adjusting a MCS according to an example of the present disclosure. As shown in FIG. 5, the method includes the following procedures.

In block 500, a base station informs a UE to feed back a MCS variation via a downlink control signaling.

For example, the base station configures an indicator in a Physical Downlink Control CHannel (PDCCH). After the UE receives the indicator, the UE determines whether to feed back a MCS variation based on the indicator. This indicator may be dynamically configured. Thus, the UE may calculate the MCS variation after the indicator is received.

For example, the base station obtains a BLER according the downlink HARQ result, and when the BLER is greater than a pre-determined threshold, the indicator is configured in the PDCCH.

In block 501, the base station transmits a first downlink data frame to the UE at a first moment.

In block 502, the UE receives the first downlink data frame, and estimates a first SINR and a first CQI according to the first downlink data frame.

In block 503, the base station transmits a second downlink data frame to the UE at a second moment.

In block 504, the UE receives the second downlink data frame, and estimates a second SINR and a second CQI according to the second downlink data frame, and further calculates a MCS variation.

In block 505, if the UE determines from the received downlink control signaling that the MCS variation is required to feed back in block 501, the UE feeds back the MCS variation to the base station.

In block 506, the base station adjusts the MCS used for the following downlink data transmission according to the received MCS variation feed back by the UE.

In block 507, the base station transmits a third downlink data frame to the UE at a third moment according to the adjusted MCS.

Figure 6:
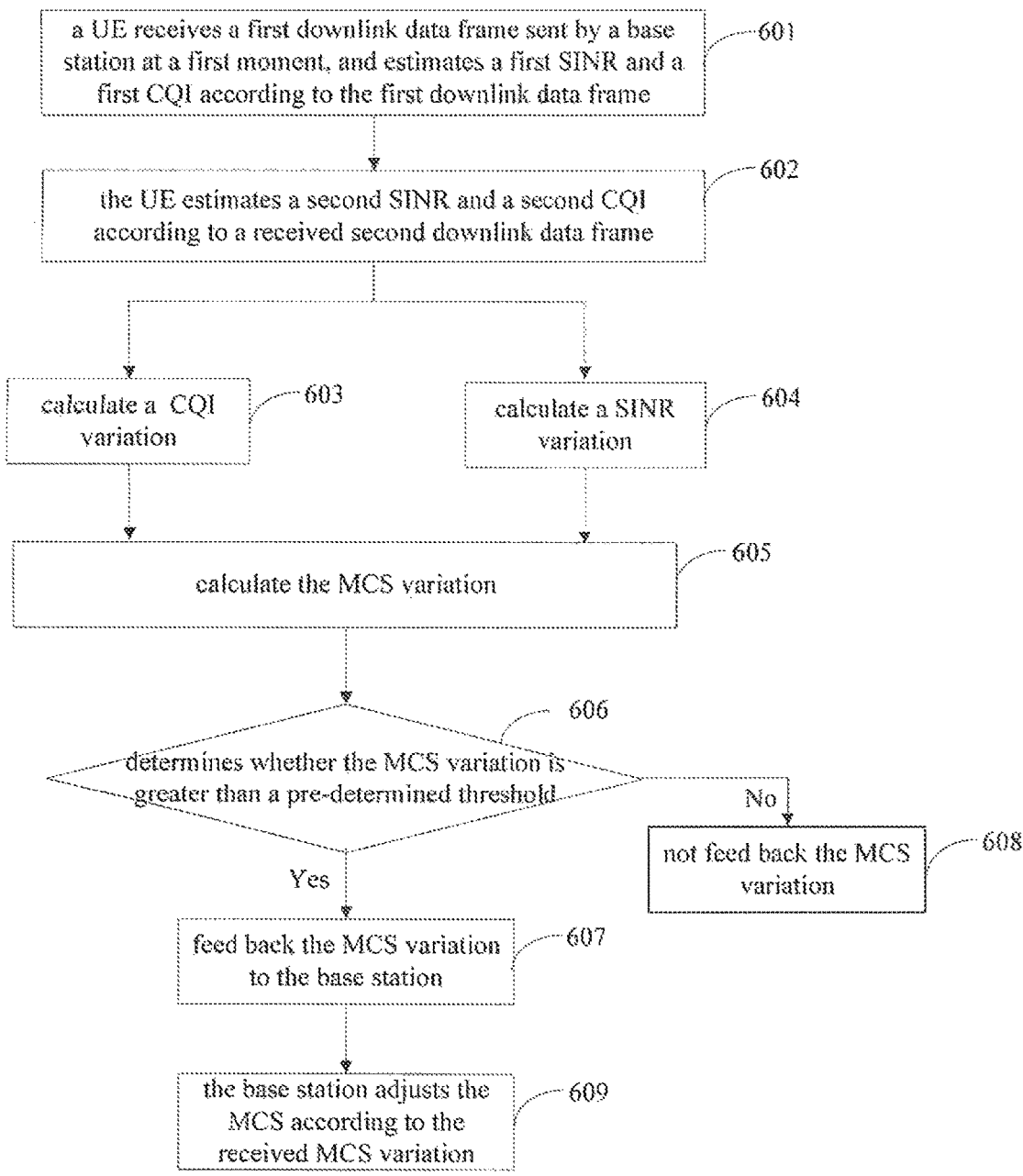
FIG. 6 is a flow chart illustrating a method for adjusting a MCS according to an example of the present disclosure.

FIG. 6 is a flow chart illustrating a method for adjusting a MCS according to an example of the present disclosure. As shown in FIG. 6, the method includes the following procedures.

In block 601, a UE receives a first downlink data frame sent by a base station at a first moment, and estimates a first SINR and a first CQI according to the first downlink data frame.

Description of this block is same as block 101, which is not described in detail herein.

In block 602, the UE estimates a second SINR and a second CQI according to a received second downlink data frame, wherein the second downlink data frame is sent by the base station at a second moment later than the first moment.

Description of this block is same as block 102, which is not described in detail herein.

In block 603, the UE calculates a CQI variation according to the first CQI and the second CQI.

Description of this block is same as block 303, which is not described in detail herein.

In block 604, the UE calculates a SINR variation according to the first SINR and the second SINR.

Description of this block is same as block 403, which is not described in detail herein.

In block 605, the MCS variation is calculated according to the CQI variation and SINR variation.

In an example, the MCS variation may be calculated according to the above two parameters as following.

In step 6051, a CQI value interval corresponding to the CQI variation is determined, and a MCS offset corresponding to the CQI value interval is determined according to the offset correspondence as a first MCS variation, denoted by $\Delta MCS1$.

Description of this block is same as blocks 304 and 305, which is not described in detail herein.

In step 6052, a second MCS variation, denoted by $\Delta MCS2$, is determined according to the SINR variation and the pre-determined weight.

For example, the second MCS variation is determined by:

$$\Delta MCS2 = \lambda' \times \Delta SINR \quad (5)$$

where the pre-determined weight $\lambda'$ may be different from $\lambda$ as described in block 404.

In step 6053, the first MCS variation and the second MCS variation are added together with weights.

For example, the weighted combination is given by:

$$\Delta MCS = i \times \Delta MCS1 + j \times \Delta MCS2 \quad (6)$$

where i and j stand for two weights respectively, and $0 < i < 1$, $0 < j < 1$.

In block 606, the UE determines whether the MCS variation is greater than a pre-determined threshold. If yes, perform block 607; otherwise, perform block 608.

In block 607, the UE feeds back the MCS variation to the base station.

In block 608, the UE does not feed back the MCS variation.

In block 609, the base station adjusts the MCS according to the received MCS variation.

Figure 7:
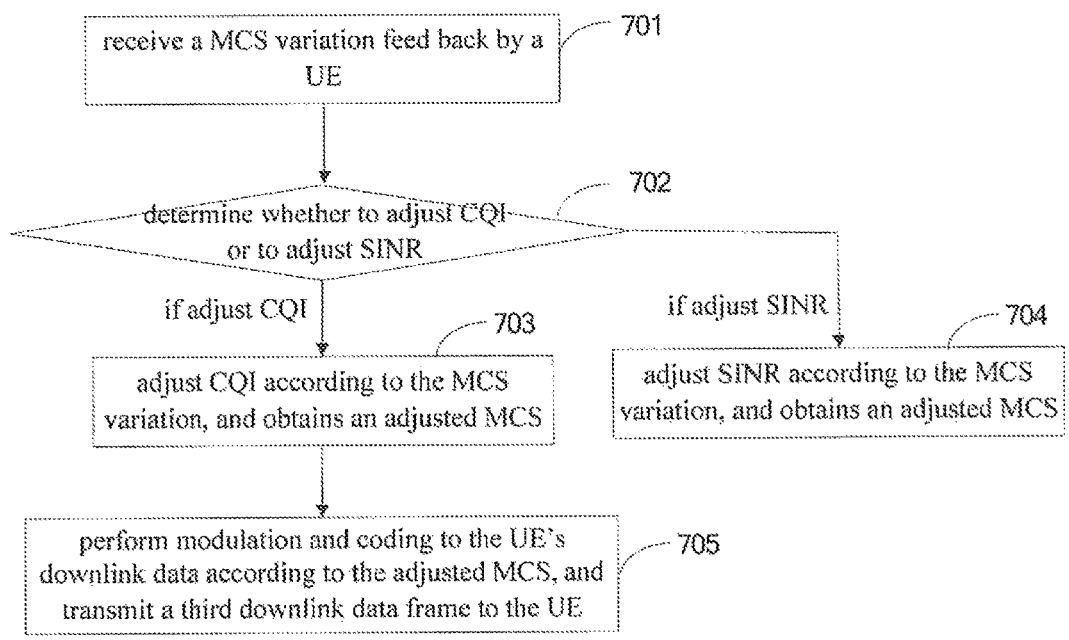
FIG. 7 is a flow chart illustrating a method for adjusting a MCS by the base station according to an example of the present disclosure.

FIG. 7 is a flow chart illustrating a method for adjusting a MCS by the base station according to an example of the present disclosure. As shown in FIG. 7, the method includes the following procedures.

In block 701, the base station receives a MCS variation feed back by a UE.

In block 702, the base station determines whether to adjust CQI or to adjust SINR. If it is determined to adjust CQI, perform block 703; if it is determined to adjust SINR, perform block 704.

For example, the determination is performed according to whether the HARQ result is received in uplink. If the HARQ result is received, SINR is adjusted; otherwise, CQI is adjusted.

In block 703, the base station adjusts CQI according to the MCS variation, and obtains an adjusted MCS.

For example, after the base station receives the second CQI and the MCS variation, the base station adds the second CQI and the MCS variation together to obtain an adjusted MCS.

In block 704, the base station adjusts SINR according to the MCS variation, and obtains an adjusted MCS.

In an implementation, block 704 may include the following steps.

In step 7041, after the base station receives the HARQ result, the base station calculates a SINR offset $SINR_{offset}$ according to the HARQ result.

The calculation may be given by:

$$\begin{cases} SINR_{offset}(t) = SINR_{offset}(t-1) + \sigma T_{BLER} & \text{if } ACK \text{ is received} \\ SINR_{offset}(t) = SINR_{offset}(t-1) + \sigma(1 - T_{BLER}) & \text{if } NACK \text{ is received} \end{cases} \quad (7)$$

where t denotes the SINR offset number, a denotes the offset step, e.g., σ=0.5, $T_{BLER}$ denotes the target BLER, e.g., $T_{BLER}$=0.1.

In step 7042, the base station compensates the SINR corresponding to the second CQI according to the SINR offset.

The SINR corresponding to the second CQI may be obtained by searching the SINR-BLER mapping table via using the MCS corresponding to the second CQI index and the target BLER, and then the obtained SINR and the SINR offset are added together.

In step 7043, the base station adds the compensated SINR and the MCS variation to obtain the adjusted MCS.

In block 705, the base station performs modulation and coding to the UE's downlink data according to the adjusted MCS, and transmits a third downlink data frame to the UE.

Figure 8:
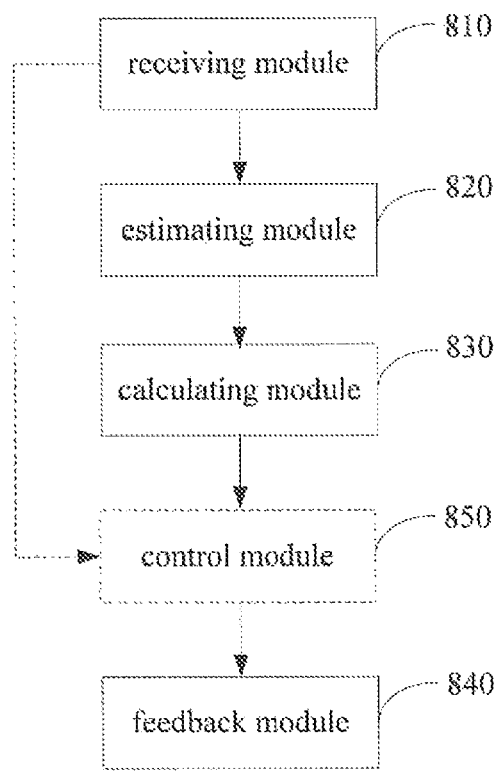
FIG. 8 is a schematic diagram illustrating a structure of a UE according to an example of the present disclosure.

FIG. 8 is a schematic diagram illustrating a structure of a UE 800 according to an example of the present disclosure, including:

a receiving module 810, configured to receive a first downlink data frame sent by a base station at a first moment and a second downlink data frame sent by the base station at a second moment, wherein the second moment is later than the first moment;

an estimating module 820, configured to estimate a first SINR and a first CQI according to the first downlink data frame received by the receiving module 810, and estimate a second SINR and a second CQI according to the second downlink data frame received by the receiving module 810;

a calculating module 830, configured to calculate a MCS variation according to at least one of the first CQI, the second CQI, the first SINR or the second SINR estimated by the estimating module 820; and a feedback module 840, configured to feed back the MCS variation to the base station.

In an example, the calculating module 830 is configured to pre-configure an offset correspondence between a MCS offset and a CQI value interval, calculate a CQI variation according to the first CQI and the second CQI estimated by the estimating module 820, determine a CQI value interval where the CQI variation falls, and according to the offset correspondence, determine a MCS offset corresponding to the determined CQI value interval as the MCS variation.

In an example, the calculating module 830 is configured to calculate a SINR variation according to the first SINR and the second SINR estimated by the estimating module 820, and determine the MCS variation according to the SINR variation and a pre-determined weight.

In an example, the feedback module 840 is further configured to feed back a downlink HARQ result and the second CQI estimated by the estimating module 820 to the base station.

In an example, the user equipment 800 may further comprise a control module 850, configured to determine whether the MCS variation calculated by the calculating module 830 is greater than a pre-determined threshold, and when the MCS variation is greater than a pre-determined threshold, control the feedback module 840 to feed back the MCS variation to the base station.

In an example, the receiving module 810 is further configured to receive a RRC signaling.

Accordingly, the control module 850 is configured to control the feedback module 840 to feed back the MCS variation to the base station according to the RRC signaling.

In an example, the feedback module 840 is configured to feed back the MCS variation to the base station in a PUCCH or in a PUSCH.

Figure 9:
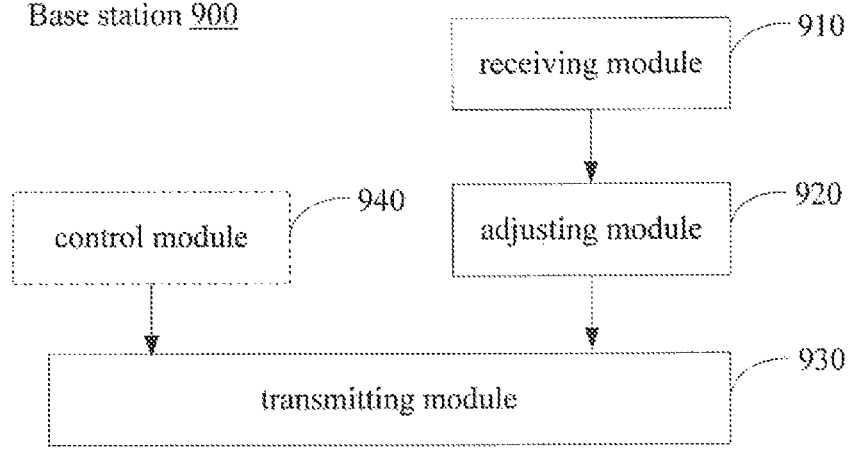
FIG. 9 is a schematic diagram illustrating a structure of a base station according to an example of the present disclosure.

FIG. 9 is a schematic diagram illustrating a structure of a base station 900 according to an example of the present disclosure, including:

a receiving module 910, configured to receive a MCS variation feed back by a UE;

an adjusting module 920, configured to adjust a MCS used for transmitting the UE's downlink data according to the MCS variation received by the receiving module 910; and a transmitting module 930, configured to perform modulation and coding to the UE's downlink data according to the MCS adjusted by the adjusting module 920, and transmit the downlink data after modulation and coding to the UE.

In an example, the receiving module 910 is configured to receive a CQI and the MCS variation feed back by the UE.

Accordingly, the adjusting module 920 is further configured to add the CQI and the MCS variation received by the receiving module 910 to obtain the MCS used for transmitting the UE's downlink data.

In an example, the receiving module 910 is configured to receive a HARQ result, a CQI and the MCS variation feed back by the UE.

Accordingly, the adjusting module 920 is further configured to compensate a SINR corresponding to the CQI received by the receiving module 910 according to the downlink HARQ result, add the compensated SINR and the MCS variation received by the receiving module 910 to obtain the MCS used for transmitting the UE's downlink data.

In an example, the base station 900 may further comprise a control module 940, configured to obtain a BLER according the downlink HARQ result, and when the BLER is greater than a pre-determined threshold, send a control instruction to the transmitting module 930.

Accordingly, the transmitting module 930 is further configured to transmit a downlink control signaling to inform the UE to feed back the MCS variation according to the control instruction.

With evolution of mobile communication system, in order to maintain good system throughput with low cost at the receiver, orthogonal multiple access technologies have been applied in the $2^{nd}$ generation (2G), $3^{rd}$ generation (3G) and $4^{th}$ generation (4G) systems, for example, Time Division Multiple Access (TDMA), Code Division Multiple Access (CDMA) and Orthogonal Frequency Division Multiple Access (OFDMA). Currently, in order to enhance the spectrum efficiency 5-15 times in the $5^{th}$ generation (5G) system, a new multiple access multiplexing technology is proposed, i.e., Non-Orthogonal Multiple Access (NOMA). Among the orthogonal multiple access technologies, only a single wireless resource is allocated to a UE, for example, separated in frequency or time, while in NOMA, a single wireless resource may be allocated to multiple UEs.

Figure 10:
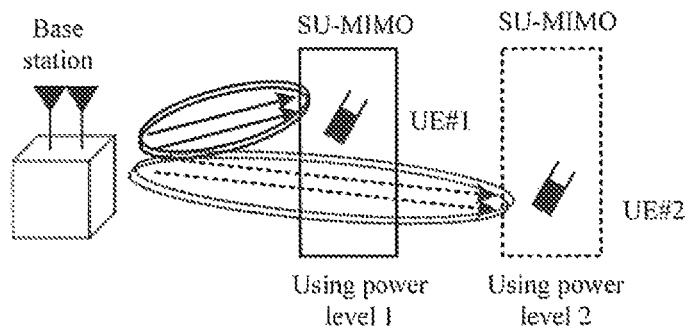
FIG. 10 is a schematic diagram illustrating an implementation scenario according to an example of the present disclosure.

FIG. 10 is a schematic diagram illustrating an implementation scenario according to an example of the present disclosure. Channel quality of UE#1 is much different from that of UE#2. Thus, it enables the base station to combine the transmit signals of UE#1 and UE2 who have much different channel qualities in downlink scheduling, so that the difference in channel qualities of multiple UEs may be transformed to multiplexing gain. UE may perform demultiplexing using a sequential interference cancelling technology.

In the scenario as shown in FIG. 10, because UE#1 and UE2 are non-orthogonal in power dimension, UE#1 cannot know interference caused by the paired UE#2 when UE#1 estimates a downlink CQI according to a RS, so that the CQI feed back by UE#1 is much different from the real CQI in actual downlink NOMA transmission. That is, the MCS determined by the base station according to the CQI feed back by UE#1 is much different from the MCS when UE#1 and UE2 are in actual downlink NOMA transmission. Hence, in NOMA transmission, more error may be caused by the current CQI feedback procedure, thus the accuracy of MCS when the base station performs scheduling is reduced, and it is required to adjust the MCS.

The method for adjusting a MCS according to examples of the present disclosure may also be applied in general Multiple User-Multiple Input Multiple Output (MU-MIMO) scenarios, where interference from other UEs in downlink is also available.

In the scenario as shown in FIG. 10, there are two antennas in the base station. The base station uses these two antennas to perform Single User-Multiple Input Multiple Output (SU-MIMO) transmission for UE#1, and according to NOMA, the base station also uses these two antennas to perform SU-MIMO transmission for UE#2 at the same time. That is, powers used in two links for performing SU-MIMO are different, i.e., UE#1 uses a power defined by a power level 1, while UE#2 uses a power defined by a power level 2.

Through simulation, performance is compared between the method with adjusting a MCS provided by examples of the present disclosure and the method without adjusting a MCS. Table 6 shows the system-level parameters used in the simulation.

TABLE 6

Simulation parameters

| Parameters | | Value |
|---|---|---|
| Cell layout | | Hexagonal grid, 19 cell sites, Wrap around |
| Inter-site distance | | 500 m |
| Carrier frequency | | 2.0 GHz |
| Overall transmission bandwidth | | 10 MHz |
| Resource block bandwidth | | 180 kHz |
| Number of resource blocks | | 48 |
| Number of users per sector | | 10, 20 |
| BS transmit antenna | Number of antennas | 2 |
| | Antenna gain | 14 dBi |
| UE receive antenna | Number of antennas | 2 |
| | Antenna gain | 0 dBi |
| Maximum transmission power | | 46 dBm |
| Distance dependent path loss | | $128.1 + 37.6\log_{10}(r)$, r. kilometers (dB) |
| Shadowing standard deviation | | 8 dB |
| Channel model | | Spatial Channel Model, SCM, Urban Macro |
| Receiver noise density | | −174 dBm/Hz |
| User speed | | 3 km/h |
| Maximum number of multiplexed UEs | | m = 1 (OMA) m = 2 (NOMA) |
| MCS selection | | Target BLER: below 10 |
| Rank report interval | | 100 msec |
| CQI/PMI feedback interval | | 10 msec |
| HARQ | | No |
| Traffic model | | Full Buffer |

Figure 11:
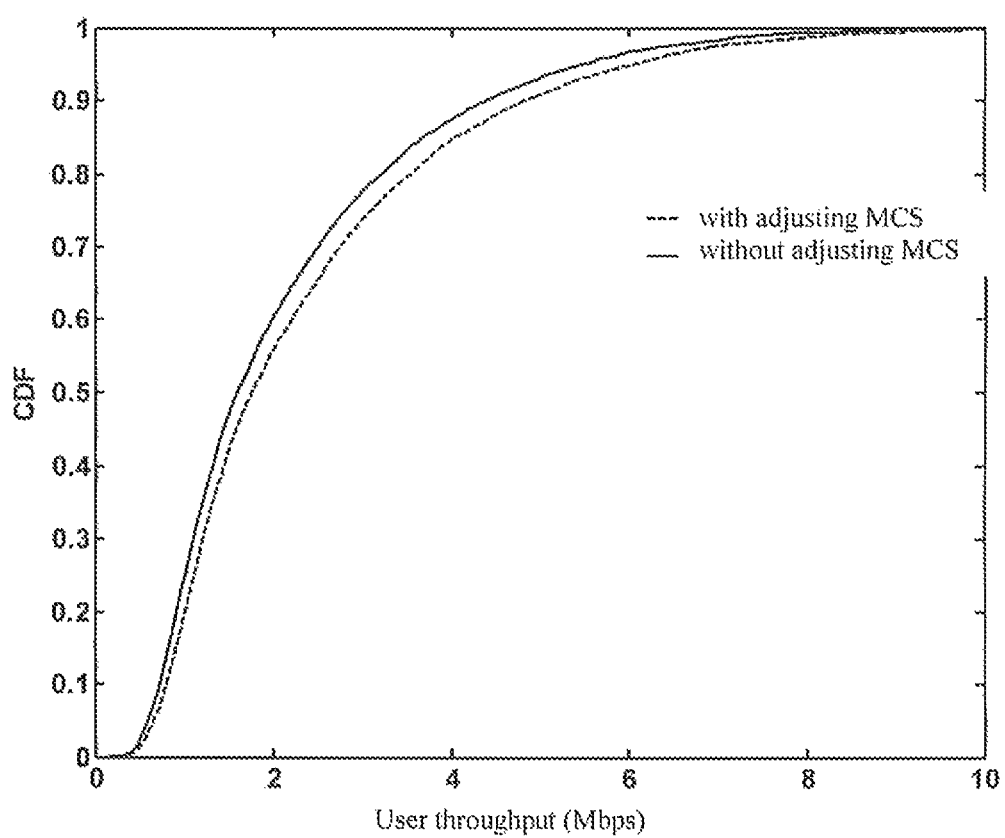
FIG. 11 is a schematic diagram illustrating user throughput of the method with adjusting a MCS and without adjusting a MCS according to an example of the present disclosure.

FIG. 11 is a schematic diagram illustrating user throughput of the method with adjusting a MCS and without adjusting a MCS according to an example of the present disclosure. As shown from the Cumulative Distribution Function (CDF) curves of the user throughput, using the method with adjusting a MCS provided by examples of the present disclosure, the user throughput is improved greatly.

Figure 12:
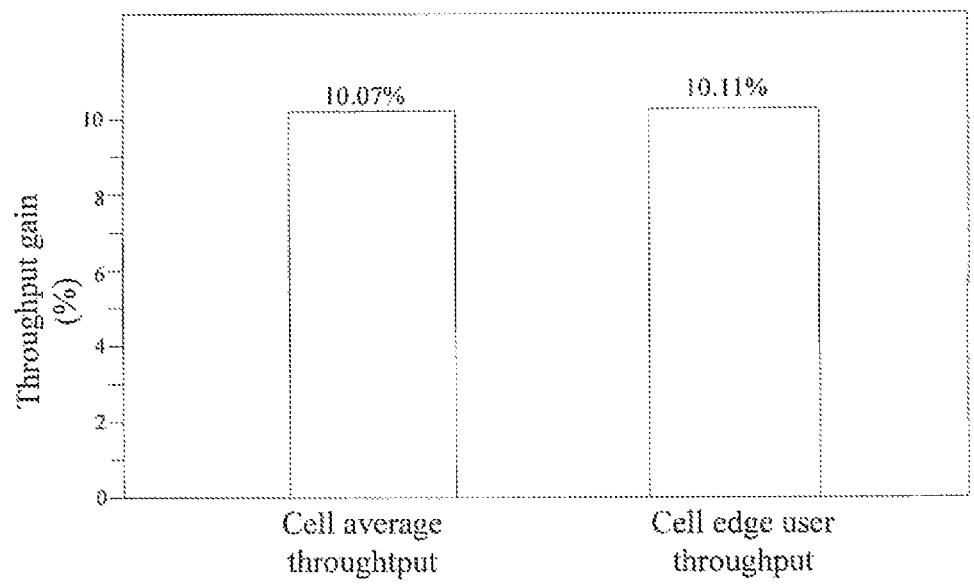
FIG. 12 is a schematic diagram illustrating performance of the method with adjusting a MCS and without adjusting a MCS according to another example of the present disclosure.

FIG. 12 is a schematic diagram illustrating performance of the method with adjusting a MCS and without adjusting a MCS according to another example of the present disclosure. Performance includes cell average throughput and cell edge user throughput. It can be seen that, using the method with adjusting a MCS provided by examples of the present disclosure, about 10% throughput gain is obtained in terms of these two parameters.

Figure 13:
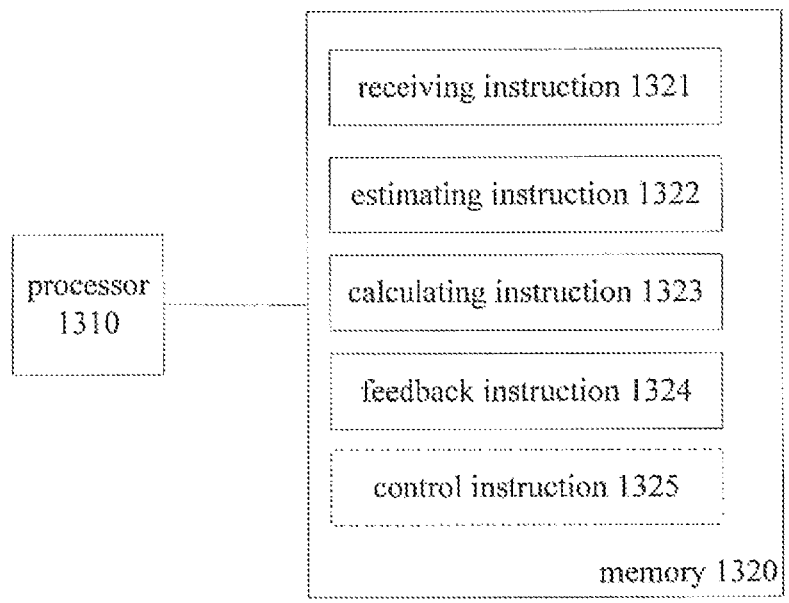
FIG. 13 is a schematic diagram illustrating a structure of a UE according to another example of the present disclosure.

FIG. 13 is a schematic diagram illustrating a structure of a UE according to another example of the present disclosure. As shown in FIG. 13, the UE comprises a processor 1310 and a memory 1320 communicated with the processor 1310; in the memory 1320, the instructions that are executed by the processor 1310 are stored, comprising a receiving instruction 1321, an estimating instruction 1322, a calculating instruction 1323, and a feedback instruction 1324.

The receiving instruction 1321 indicates to receive a first downlink data frame sent by a base station at a first moment and a second downlink data frame sent by the base station at a second moment, wherein the second moment is later than the first moment. The estimating instruction 1322 estimate a first SINR and a first CQI according to the first downlink data frame, and estimate a second SINR and a second CQI according to the second downlink data frame. The calculating instruction 1323 indicates to calculate a MCS variation according to at least one of the first CQI, the second CQI, the first SINR or the second SINR. The feedback instruction 1324 indicates to feed back the MCS variation to the base station.

In an example, the memory 1320 may further store a control instruction 1325. The control instruction 1325 indicates to determine whether the MCS variation is greater than a pre-determined threshold, and when the MCS variation is greater than a pre-determined threshold, control to feed back the MCS variation to the base station.

Operations indicated by these instructions are similar to the above-described corresponding modules, which are not described in detail herein.

Figure 14:
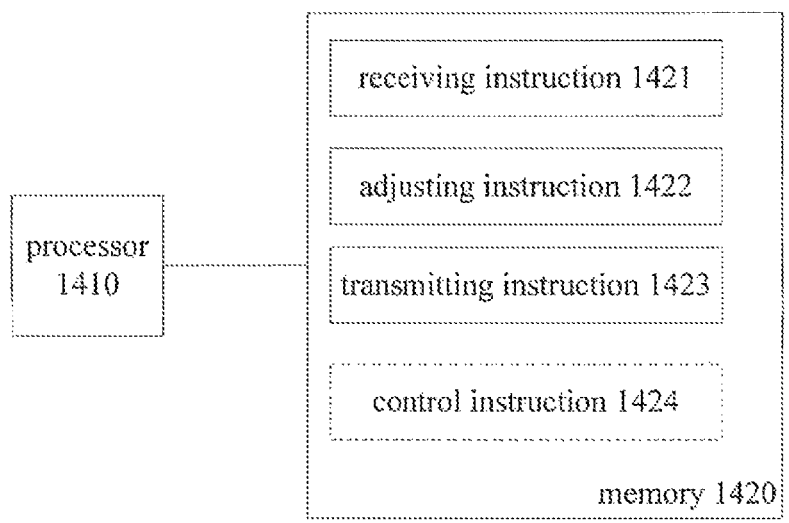
FIG. 14 is a schematic diagram illustrating a structure of a base station according to another example of the present disclosure.

FIG. 14 is a schematic diagram illustrating a structure of a base station according to another example of the present disclosure.

As shown in FIG. 14, the UE comprises a processor 1410 and a memory 1420 communicated with the processor 1410; in the memory 1420, the instructions that are executed by the processor 1410 are stored, comprising a receiving instruction 1421, an adjusting instruction 1422 and a transmitting instruction 1423.

The receiving instruction 1421 indicates to receive a MCS variation feed back by a UE. The adjusting instruction 1422 indicates to adjust a MCS used for transmitting the UE's downlink data according to the MCS variation. The transmitting instruction 1423 indicates to perform modulation and coding to the UE's downlink data according to the MCS, and transmit the downlink data after modulation and coding to the UE.

In an example, the memory 1420 may further store a control instruction 1424. The control instruction 1424 indicates to obtain a BLER according the downlink HARQ result, and when the BLER is greater than a pre-determined threshold, send a control instruction to the transmitting instruction 1423. Accordingly, the transmitting instruction 1423 further indicates to transmit a downlink control signaling to inform the UE to feed back the MCS variation according to the control instruction.

Operations indicated by these instructions are similar to the above-described corresponding modules, which are not described in detail herein.

According to examples of the present disclosure, by calculating a MCS variation and feeding back the MCS variation to the base station by the UE, the base station is able to know the channel quality bias estimated by the UE. Further, the base station is able to dynamically adjust the MCS used for the actual downlink data transmission according to the MCS variation, so that the accuracy of MCS for following transmission is improved, and the accuracy of downlink scheduling is enhanced accordingly. Simulation results show that the system throughput and user throughput are enhanced in some degree.

The foregoing is preferred examples of the present disclosure, which is not used for limiting the protection scope of the present disclosure. Any modifications, equivalent substitutions and improvements made within the spirit and principle of the present disclosure, should be covered by the protection scope of the present disclosure.

What is claimed is:

1. A method for adjusting a Modulation and Coding Scheme (MCS), comprising:
   receiving, by a user equipment (UE), a first downlink data frame sent by a base station at a first moment, and estimating a first Signal to Interference and Noise Ratio (SINR) and a first Channel Quality Indicator (CQI) according to the first downlink data frame;
   estimating, by the UE, a second SINR and a second CQI according to a received second downlink data frame, wherein the second downlink data frame is sent by the base station at a second moment later than the first moment;
   calculating, by the UE, an MCS variation according to the first CQI and the second CQI, or according to the first SINR and the second SINR, or according to the first CQI, the second CQI, the first SINR and the second SINR; and
   feeding back, by the UE, the MCS variation to the base station;
   wherein calculating the MCS variation according to the first CQI and the second CQI comprises:
   pre-configuring, by the UE, an offset correspondence between MCS offsets and CQI variation ranges;
   calculating, by the UE, a CQI variation according to the first CQI and the second CQI; and
   determining, by the UE, a CQI variation range where the CQI variation falls, and according to the offset correspondence, determining an MCS offset corresponding to the determined CQI variation range as the MCS variation; or
   calculating the MCS variation according to the first SINR and the second SINR comprises:
   calculating, by the UE, a SINR variation according to the first SINR and the second SINR, wherein the first SINR and the second SINR are equivalent SINRs of all resource blocks allocated to the UE, and are obtained according to received power of a reference signal (RS) at each resource block (RB), a sum of signal power received from adjacent cells at an RB for transmitting the RS, and noise power at the RB when the first downlink data frame and the second downlink data frame are received by the UE; and
   determining, by the UE, the MCS variation according to the SINR variation and a pre-determined weight.

2. The method of claim 1, further comprising:
   receiving, by the base station, the second CQI and the MCS variation, and obtaining an MCS used for transmitting a third downlink data frame by adding the second CQI and the MCS variation, wherein the third downlink data frame is sent by the base station at a third moment later than the second moment.

3. The method of claim 1, further comprising:
   feeding back, by the UE, a downlink Hybrid Automatic Repeat Request (HARQ) result and the second CQI to the base station;
   compensating, by the base station, a SINR corresponding to the second CQI according to the downlink HARQ result, and obtaining an MCS used for transmitting a third downlink data frame by adding the compensated SINR and the MCS variation, wherein the third downlink data frame is sent by the base station at a third moment later than the second moment.

4. The method of claim 1, wherein feeding back the MCS variation to the base station comprises:
   determining, by the UE, whether the MCS variation is greater than a pre-determined threshold;
   when the MCS variation is greater than a pre-determined threshold, feeding back, by the UE, the MCS variation to the base station.

5. The method of claim 1, further comprising:
   informing, by the base station, a UE to feed back the MCS variation to the base station by a Radio Resource Control (RRC) signaling.

6. A user equipment, comprising: a processor and a memory communicated with the processor, wherein the memory stores instructions executable by the processor, and the instructions when executed, cause the processor to:
   receive a first downlink data frame sent by a base station at a first moment and a second downlink data frame sent by the base station at a second moment, wherein the second moment is later than the first moment;
   estimate a first Signal to Interference and Noise Ratio (SINR) and a first Channel Quality Indicator (CQI) according to the first downlink data frame, and estimate a second SINR and a second CQI according to the second downlink data frame;
   calculate a Modulation and Coding Scheme (MCS) variation according to the first CQI and the second CQI, or according to the first SINR and the second SINR, or according to the first CQI, the second CQI, the first SINR and the second SINR; and
   feed back the MCS variation to the base station;
   wherein calculating the MCS variation according to the first CQI and the second CQI comprises:
   pre-configuring, by the UE, an offset correspondence between MCS offsets and CQI variation ranges;
   calculating, by the UE, a CQI variation according to the first CQI and the second CQI; and
   determining, by the UE, a CQI variation range where the CQI variation falls, and according to the offset correspondence, determining an MCS offset corresponding to the determined CQI variation range as the MCS variation; or
   calculating the MCS variation according to the first SINR and the second SINR comprises:
   calculating, by the UE, a SINR variation according to the first SINR and the second SINR, wherein the first SINR and the second SINR are equivalent SINRs of all resource blocks allocated to the UE, and are obtained according to received power of a reference signal (RS) at each resource block (RB), a sum of signal power received from adjacent cells at an RB for transmitting the RS, and noise power at the RB when the first downlink data frame and the second downlink data frame are received by the UE; and
   determining, by the UE, the MCS variation according to the SINR variation and a pre-determined weight.

7. The user equipment of claim 6, wherein when the instructions cause the processor to perform the feeding back the MCS variation to the base station, the instructions cause the processor to:
  feed back a downlink Hybrid Automatic Repeat Request (HARQ) result and the second CQI to the base station.

8. A base station, comprising: a memory and a processor, the memory storing instructions, and the instructions, when executed by the processor, causing the processor to:
  receive a Modulation and Coding Scheme (MCS) variation fed back by a User Equipment (UE), wherein the MCS variation is calculated by the UE according to a first Channel Quality Indicator (CQI) and a second CQI, or according to a first Signal to Interference and Noise Ratio (SINR) and a second SINR, or according to the first CQI, the second CQI, the first SINR and the second SINR; the first SINR and the first CQI are estimated by the UE according to a first downlink data frame transmitted by the base station at a first moment, and the second SINR and the second CQI are estimated by the UE according to a second downlink data frame transmitted by the base station at a second moment, wherein the second moment is later than the first moment, wherein the first SINR and the second SINR are equivalent SINRs of all resource blocks allocated to the UE, and are obtained according to received power of a reference signal (RS) at each resource block (RB), a sum of signal power received from adjacent cells at an RB for transmitting the RS, and noise power at the RB when the first downlink data frame and the second downlink data frame are received by the UE;
  receive a downlink Hybrid Automatic Repeat Request (HARQ) result and the second CQI fed back by the UE;
  adjust an MCS used for transmitting subsequent downlink data of the UE according to the MCS variation by compensating the second SINR corresponding to the second CQI according to the downlink HARQ result, and adding the compensated SINR and the MCS variation to obtain the MCS used for transmitting the subsequent downlink data of the UE; and
  perform modulation and coding to the subsequent downlink data of the UE according to the adjusted MCS, and transmit the downlink data after modulation and coding to the UE.

* * * * *